United States Patent
Doshi et al.

(10) Patent No.: US 11,195,216 B2
(45) Date of Patent: Dec. 7, 2021

(54) FEDERATED MARKETPLACE PORTAL

(71) Applicant: ENT. SERVICES DEVELOPMENT CORPORATION LP, Houston, TX (US)

(72) Inventors: Parag Doshi, Marietta, GA (US); Chandra Kamalakantha, Plano, TX (US); Steve Marney, Pontiac, MI (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 599 days.

(21) Appl. No.: 15/749,500

(22) PCT Filed: Jul. 31, 2015

(86) PCT No.: PCT/US2015/043232
§ 371 (c)(1),
(2) Date: Jan. 31, 2018

(87) PCT Pub. No.: WO2017/023268
PCT Pub. Date: Feb. 9, 2017

(65) Prior Publication Data
US 2018/0225732 A1    Aug. 9, 2018

(51) Int. Cl.
*G06Q 30/00*    (2012.01)
*G06Q 30/06*    (2012.01)
(Continued)

(52) U.S. Cl.
CPC ....... *G06Q 30/0601* (2013.01); *G06F 16/164* (2019.01); *G06Q 10/101* (2013.01); *G06Q 30/04* (2013.01); *G06Q 30/0641* (2013.01)

(58) Field of Classification Search
CPC ... G06Q 30/0601–0645; G06Q 10/101; G06Q 30/04; G06F 16/164
(Continued)

(56) References Cited

U.S. PATENT DOCUMENTS 8,261,295 B1 * 9/2012 Risbood .............. H04L 41/5012
                                                   719/328
8,346,929 B1    1/2013 Lai
(Continued)

FOREIGN PATENT DOCUMENTS

WO    2012021330    2/2012
WO    2014039921    3/2014

OTHER PUBLICATIONS

E. G. Amoroso, "Practical methods for securing the cloud," in IEEE Cloud Computing, vol. 1, No. 1, pp. 28-38, May 2014, doi: 10.1109/MCC.2014.17. (Year: 2014).*

(Continued)

*Primary Examiner* — Resha Desai
*Assistant Examiner* — Kennedy Gibson-Wynn
(74) *Attorney, Agent, or Firm* — Polsinelli PC (57) ABSTRACT

A system includes a federated marketplace portal to allow a user to browse, order, and manage business services offered by a plurality of cloud marketplaces based at least in part on application programming interface (API) abstractions. The system includes an integration system to transform the API abstractions into product-specific APIs used by the cloud marketplaces and cause the invocation of the product-specific APIs.

15 Claims, 5 Drawing Sheets

(51) Int. Cl.
*G06F 16/16* (2019.01)
*G06Q 30/04* (2012.01)
*G06Q 10/10* (2012.01)

(58) Field of Classification Search
USPC .............................................. 705/26.1–27.2
See application file for complete search history.

(56) References Cited

U.S. PATENT DOCUMENTS

| | | | |
|---|---|---|---|
| 10,395,293 B1* | 8/2019 | Mangtani ........... | G06Q 30/0623 |
| 2010/0131624 A1 | 5/2010 | Ferris | |
| 2012/0185913 A1 | 7/2012 | Martinez | |
| 2012/0311614 A1 | 12/2012 | DeAnna | |
| 2013/0198386 A1* | 8/2013 | Srikanth ............. | G06F 21/6236 |
| | | | 709/203 |
| 2013/0238788 A1 | 9/2013 | Caminiti | |
| 2013/0291121 A1 | 10/2013 | Iovanov | |
| 2014/0006627 A1* | 1/2014 | Arwe ................ | H04L 29/08153 |
| | | | 709/226 |
| 2014/0075520 A1* | 3/2014 | Subramanian .......... | H04L 29/06 |
| | | | 726/4 |
| 2014/0075565 A1* | 3/2014 | Srinivasan ............. | H04L 29/06 |
| | | | 726/26 |
| 2014/0279201 A1* | 9/2014 | Iyoob .................... | G06F 9/5077 |
| | | | 705/26.7 |
| 2015/0156065 A1* | 6/2015 | Grandhe ............. | H04L 41/5054 |
| | | | 709/224 |
| 2015/0363374 A1* | 12/2015 | Lees ....................... | G06F 17/24 |

OTHER PUBLICATIONS

International Application No. PCT/US2015/043232, International Search Report and Written Opinion dated May 13, 2016.

European Patent Application No. 15900536.2, Search Report dated Jan. 8, 2019.

Binz, Tobias et al., "Portable Cloud Services Using TOSCA," IEEE Internet Computing, vol. 16, No. 3, pp. 80-85, May 2012.

* cited by examiner

FEDERATED MARKETPLACE PORTAL

CROSS-REFERENCE TO RELATED APPLICATIONS

This application is a national stage application pursuant to 35 U.S.C. § 371 of International Application No. PCT/US2015/043232, filed Jul. 31, 2015, the disclosure of which is hereby incorporated by reference herein.

BACKGROUND

Cloud computing means Internet ("Cloud") based development and use of computer technology ("Computing"). It is a style of computing where IT-related capabilities are provided "as a service", allowing users to access technology-enabled services "in the cloud" without knowledge of, expertise with, or control over the technology infrastructure that supports them. It is a general concept that incorporates software as a service and relies on the Internet for satisfying the computing needs of the users. The majority of cloud computing infrastructure currently includes reliable services delivered through next-generation data centers that are built on compute and storage virtualization technologies. The services are accessible anywhere in the world, with the Cloud appearing as a single point of access for all the computing needs of consumers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The term "cloud" as used herein is meant to be understood broadly as any network that delivers requested virtual resources as a service. In one example, a cloud network may provide a computing environment where users can have access to applications or computing resources, as services, from anywhere through their connected devices. These services may be provided by entities called cloud services providers. Examples of services that may be provided via a cloud network include infrastructure as a service (IaaS), platform as a service (PaaS), and software as a service (SaaS).

A cloud may be implemented as a public cloud, private cloud, or hybrid cloud. The term "public cloud" as used herein is meant to be understood broadly as a number of services provided by a service provider over a network that makes applications, storage, and other resources available to the general public. In one example, these services are offered by the service provider on a pay-per-use model. In this example, the public cloud service providers own and operate the infrastructure. In another example, the public cloud service provider offers access via a public network such as, for example, the Internet, and direct connectivity is not offered.

The term "private cloud" as used herein is meant to be understood broadly as any cloud computing environment in which access is exclusively limited to an individual or a business entity. In one example, a private cloud may be any cloud infrastructure operated solely for a single individual or business entity. In one example, the private cloud is managed internally by the owner of the private cloud infrastructure. In another example, the private cloud is managed by a third-party and hosted internally or externally.

The term "hybrid cloud" as used herein is meant to be understood broadly as any cloud computing environment that comprises a number of public cloud resources and a number of private cloud resources. In one example, a hybrid cloud comprises a number of cloud networks such as private clouds and public clouds that remain individual networks but are associated to offer a number of services.

The term "federated" as used herein is meant to be understood broadly as the ability to use one system or technology as a single logical instance when in reality instances are distributed across multiple distinct systems or environments. As an example, Federated Identity is a solution in which a user's identity (also referred to as a token in this context) is trusted across multiple IT systems, environments, or organizations.

The term "marketplace" as used herein is meant to be understood broadly as including a catalog in which multiple contributors offer and publish services. It is termed "market" because the catalog may include offerings that span across multiple organizations or companies.

The term "portal" as used herein is meant to be understood broadly as a user interface entry point that enables users to order items from the marketplace catalog.

The term "federated marketplace portal" as used herein is meant to be understood broadly as a portal that provides abstraction so users view the portal as one logical instance when in reality different instances (which may be based on completely different products and technologies) exist and may be distributed across multiple environments.

Figure 1:
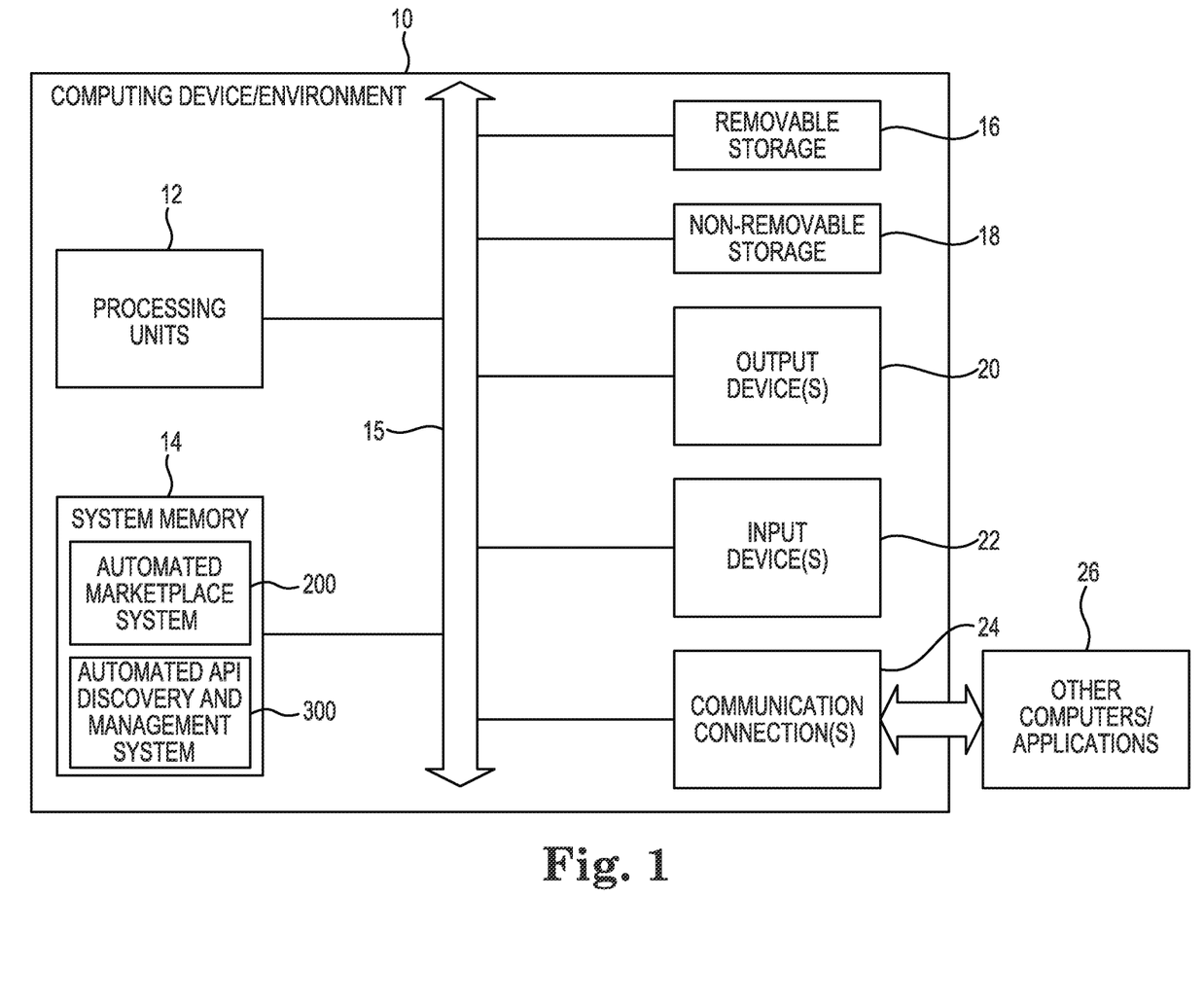
FIG. 1 is a diagram illustrating a computing environment suitable for implementing aspects of an automated marketplace system and an automated API discovery and management system according to one example.

FIG. 1 is a diagram illustrating a computing environment 10 suitable for implementing aspects of an automated marketplace system and an automated API discovery and management system according to one example. In the illustrated example, the computing system or computing device 10 includes processing units 12 and system memory 14. Depending on the exact configuration and type of computing device, memory 14 may be volatile (such as RAM), non-volatile (such as ROM, flash memory, etc.), or some combination of the two.

Computing device 10 may also have additional or different features/functionality and additional or different hardware and software. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for non-transitory storage of information such as computer readable instructions, data structures, program modules or other data, and does not include transitory storage media. Memory 14, removable storage 16 and non-removable storage 18 are all examples of computer storage media (e.g., non-transitory computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of computing device 10.

The various elements of computing device 10 are communicatively coupled together via communication links 15. Computing device 10 also includes communication connections 24, such as network connections, that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which examples may be implemented. It should be understood, however, that handheld, portable, and other computing devices of all kinds are contemplated for use. FIG. 1 thus illustrates an example of a suitable computing system environment 10 in which the examples described herein may be implemented, although as made clear above, the computing system environment 10 is one example of a suitable computing environment and is not intended to suggest any limitation as to the scope of use or functionality of the examples. Neither should the computing environment 10 be interpreted as having any dependency or requirement relating to any one or combination of components illustrated in the example operating environment 10.

As shown in FIG. 1, at least one component of an automated marketplace system 200 and at least one component of an automated API discovery and management system 300 may be stored in system memory 14. Examples of systems 200 and 300 are described in further detail below with reference to FIGS. 2 and 3, respectively.

Enterprises are establishing cloud strategies and one of the pillars of these strategies is the establishment of a marketplace serving as the focal point where users publish, advertise, order, monitor, view/manage bills, and manage operations for cloud business services. The proliferation of these marketplaces has created a sort of chaos where sharing and consumption of content is difficult or impossible. This marketplace proliferation is occurring within large companies as well as across companies that attempt to work or partner together. Some companies may wish to enable users at other companies to seamlessly share, contribute, and manage business services published in their separate marketplaces as if they were one. To do this securely and manageably, a company's catalog should support multi-tenancy and federation to safely manage this sharing of content. One option is to republish content across catalogs, but this may lead to synchronization issues and unnecessary management overhead.

Examples disclosed herein address the issues identified above. Some examples are directed to a federated marketplace that promotes the sharing, harvesting, and managing of business services across multiple marketplace portals. By enabling a common access mechanism for managing business services, these services can appear seamlessly across multiple enterprises, promoting reuse and harvesting/sharing across different business units and different companies.

Figure 2:
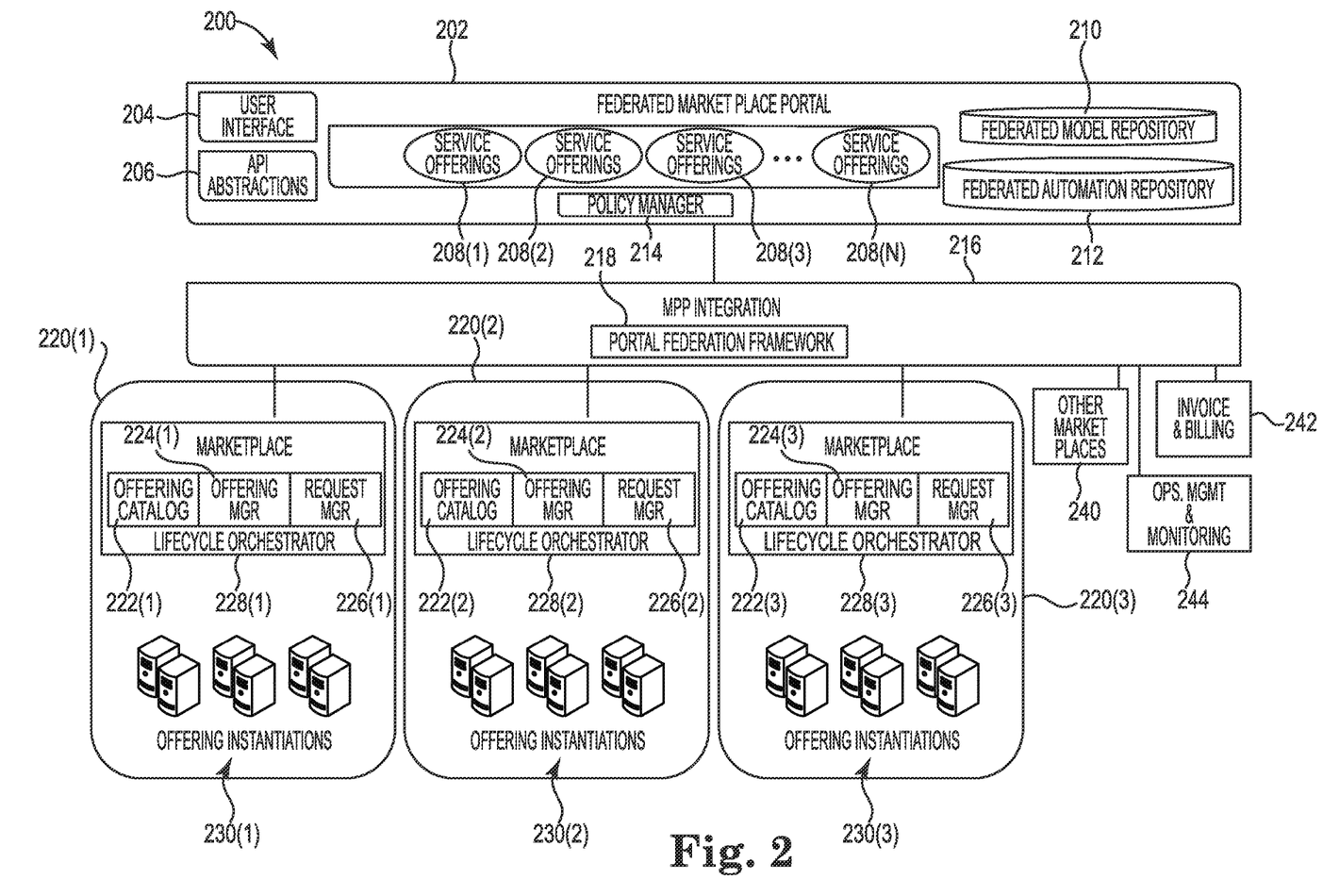
FIG. 2 is a diagram illustrating an automated marketplace system including a federated marketplace portal according to one example.

FIG. 2 is a diagram illustrating an automated marketplace system 200 including a federated marketplace portal (federated MPP) 202 according to one example. In additional to federated marketplace portal 202, system 200 also includes marketplace portal integration system 216, participating marketplaces 220(1)-220(3) (collectively referred to as participating marketplaces 220), other participating marketplaces 240, invoice and billing system 242, and operations management and monitoring system 244. In one example, marketplaces 220 and 240 are cloud marketplaces and federated marketplace portal 202 is a cloud portal.

Federated marketplace portal 202 includes user interface 204, application programming interface (API) abstractions 206, service offerings 208(1)-208(N) (collectively referred to as service offerings 208), federated model repository 210, federated automation repository 212, and policy manager 214. Federated marketplace portal 202 serves as a common integration point providing a consistent user experience through user interface 204 for browsing, ordering, and managing business services offered by multiple marketplaces 220 and 240. Portal 202 allows sharing of metadata of service offerings 208, and brokering of capabilities such as identity management. In one example, service offerings 208(1) represent business services offered by marketplace 220(1); service offerings 208(2) represent business services offered by marketplace 220(2); service offerings 208(3) represent business services offered by marketplace 220(3); and service offerings 208(N) represent business services offered by other marketplaces 240.

An element that promotes federation is adherence to certain standards. One example is the use of common model specifications, such as Topology and Orchestration Specification for Cloud Applications (TOSCA), which enables the portability of models. In one example, federated marketplace portal 202 includes a federated model repository 210 to allow the brokering and sharing of model specifications. In this manner, models can be introspected in each customer's own environment, customized for their specific use cases, and then used to perform automated lifecycle actions (such as install, configure, update, terminate, etc.). The models need not be brought into a single repository, but rather this repository may merely broker the content and provide pointers to the information via uniform resource locators (URLs).

To perform any lifecycle automation (e.g., to provision a business service), automation content is shared using federated automation repository 212. In some cases, repository 212 stores the specific code modules for performing any lifecycle action step. Having pointers to the information may be insufficient due to performance reasons and therefore automation content may be synchronized across multiple automation repositories associated with each marketplace. The federated marketplace portal 202 assists by brokering this exchange.

Policy manager 214 enforces specific policies of each of the marketplaces 220 and 240 participating in the system 200. In this manner, companies can declare specific sharing rules, constraints, and other restrictions mediating what and how specific business services are shared.

Integration of multiple disparate marketplaces 220 and 240 into the federated marketplace portal 202 is accomplished by marketplace portal integration system 216 using API abstractions 206 that are abstracted from the product-specific APIs of the various marketplaces 220 and 240. The bindings, mappings, and transformation of the API abstractions to the product specific APIs are defined declaratively and are entirely data driven, thereby enabling individual marketplaces 220 and 240 to be added/removed to/from the federated marketplace portal 202 by updating a configuration data store of the portal 202. Example API abstractions that are mapped to product-specific APIs include Create, Search, View, Update, Delete, Order, Manage, Terminate, as well as others.

APIs allow developers to consume or use whatever service (or functionality) is exposed by the API with the consumer's own program. A distinction can be made between "product-specific" APIs and "generic" APIs because off-the-shelf products typically have proprietary APIs that only work with that one specific product; whereas "generic" APIs are not limited to any one product. Federation may be enabled by establishing "generic" or more precisely "canonical" APIs that hide (or abstract) multiple product-specific APIs. The generic APIs may perform transformations to convert between product-specific data and interfaces into general ones so the rest of the architecture is more loosely coupled to a specific product. It also enables an architecture to swap one product for another as business needs change and products evolve.

The marketplace portal integration system 216 performs the appropriate security token, data, protocol, and key transformations and creates the invocation of the respective marketplace product-specific API. In an example, the product-specific API invocation is dynamically constructed as appropriate and then performed. The marketplace portal integration system 216 also performs the data and key transformations of the outputs (i.e., result sets) returned by the product-specific API. The canonical representation of the result sets are then returned to and used by the federated marketplace portal 202.

The marketplace portal integration system 216 includes portal federation framework 218. The portal federation framework 218 allows quicker integration of content from different marketplaces. Framework 218 retains metadata that allows the creation of a new portlet capable of rendering itself one-click in a new frame. This may be accomplished via XML or JSON deserialization enabling rendering using a Render program. This is a feature that enables federation and not just catalog item aggregation.

Participating marketplaces 220(1)-220(3) respectively include offering catalogs 222(1)-222(3) (collectively referred to as offering catalogs 222), offering managers 224(1)-224(3) (collectively referred to as offering managers 224), request managers 226(1)-226(3) (collectively referred to as request managers 226), lifecycle orchestrators 228(1)-228(3) (collectively referred to as lifecycle orchestrators 228), and marketplace offering instantiations 230(1)-230(3) (collectively referred to as marketplace offering instantiations 230). Examples of marketplaces 220 include a Cloud Service Automation (CSA) marketplace, a CloudForms marketplace, and a Murano marketplace. Other participating marketplaces 240 may be configured in substantially the same manner as marketplaces 220.

Offering catalogs 222(1)-222(3) provide a listing of business services offered by marketplaces 220(1)-220(3), respectively, and correspond to the service offerings 208(1)-208(3), respectively, provided by the portal 202. Users are able to order and manage the listed business services using portal 202. Offering managers 224 maintain and update the offering catalogs 222. Request managers 226 handle user requests or orders for business services that are ordered from offering catalogs 222. Lifecycle orchestrators 228(1)-228(3) generate offering instantiations 230(1)-230(3), respectively, which are instances of business services that have been ordered by users through portal 202, and also control the lifecycle of the offering instantiations 230.

When a consumer uses portal 202 to order a business service from one of the marketplaces 220 or 240, and the user also requests monitoring (e.g., health monitoring) to be a part of that service, the monitoring technology specific to that marketplace is used to perform the monitoring, and the results of the monitoring from that monitoring technology, as well as the results of the monitoring technologies of the other marketplaces, are abstracted out by operations management and monitoring system 244 for use by portal 202.

Today, in order to enable customers to share content with a given company, the customers may be forced to move their content into that company's marketplace. In contrast, system 200 provides a federated architecture supporting multiple marketplaces 220 and 240. System 200 allows customers of a given company to use their own marketplace while allowing secured sharing of content across tenants. System 200 provides a common access mechanism (e.g., user interface 204) for managing business services provided by multiple marketplaces 220 and 240, and a seamless marketplace user experience across multiple enterprises.

It may be difficult or not possible to enable monetization of services defined, modeled, and managed by an external marketplace. In contrast, system 200 enables monetization of services using invoice and billing system 242 regardless of what marketplace exposes them. Invoice and billing system 242 tracks usage of business services offered by marketplaces 220 and 240, and provides the usage information to the appropriate marketplaces 220 and 240 to allow those marketplaces 220 and 240 to bill consumers for the use of the business services.

Reuse of component or full business services today involves migrating their definitions and content to the relevant marketplace. In contrast, system 200 enables reuse without performing this migration. To enable reuse, there are knowledge bases that share information about services, but that content is not machine readable or modeled using standards such as TOSCA, and it does not enable automated lifecycle management. In contrast, system 200 provides a level of automation that enables practical reuse. Additionally, existing solutions generally focus on or are limited to a small domain (e.g., a single company). In contrast, system 200 enables content to be federated, and enables reuse and harvesting/sharing across different business units and different companies. System 200 allows detailed specifications and lifecycle management code to be shared between partner companies. This allows for a greater potential for monetization as the services can be consumed beyond one enterprise.

It is noted that system 200 does not involve merely catalog aggregation, but rather involves federation. Thus, catalog items and their content are not moved or copied from one portal to another. Instead, the content is rendered and the lifecycle is managed (e.g., deployed) from wherever they are natively available. System 200 provides unified catalog policy management across multiple federated content providers, and automated aggregation and synchronization of metadata from multiple catalogs. Automated synchronization of content reduces the overhead of manually copying the content across multiple marketplaces while policies are used to ensure the sharing is done securely.

There is a large proliferation of APIs being created and exposed for external applications to consume. While this greatly eases the inertia for integration, the proliferation has become unmanageable. API registries, repositories, and gateways are manually configured. However, customers deploying applications and services into a cloud computing environment demand a high degree of automation and self-service. This means that applications and services be deployed into a usable state with "one-click" functionality. An application may not be considered usable and consumable until the proper metadata including the API are also published.

Some examples disclosed herein add an extra step to the deployment lifecycle, namely the automated publishing and pre-population of the relevant APIs of a business application or service. Some examples automatically discover the relevant APIs with documentation, and automatically configure an API gateway. Examples disclosed herein provide one-click deployment, automated API discovery, automated pre-population of an API manager, automated pre-population of API gateway configurations, and automated updates when an API endpoint is moved. Some examples are directed to a system and method to automate the lifecycle of API management as it relates to business solution or application deployment. This facilitates delivering "one-click" deployment for end-to-end self-service of cloud and non-cloud solutions.

Figure 3:
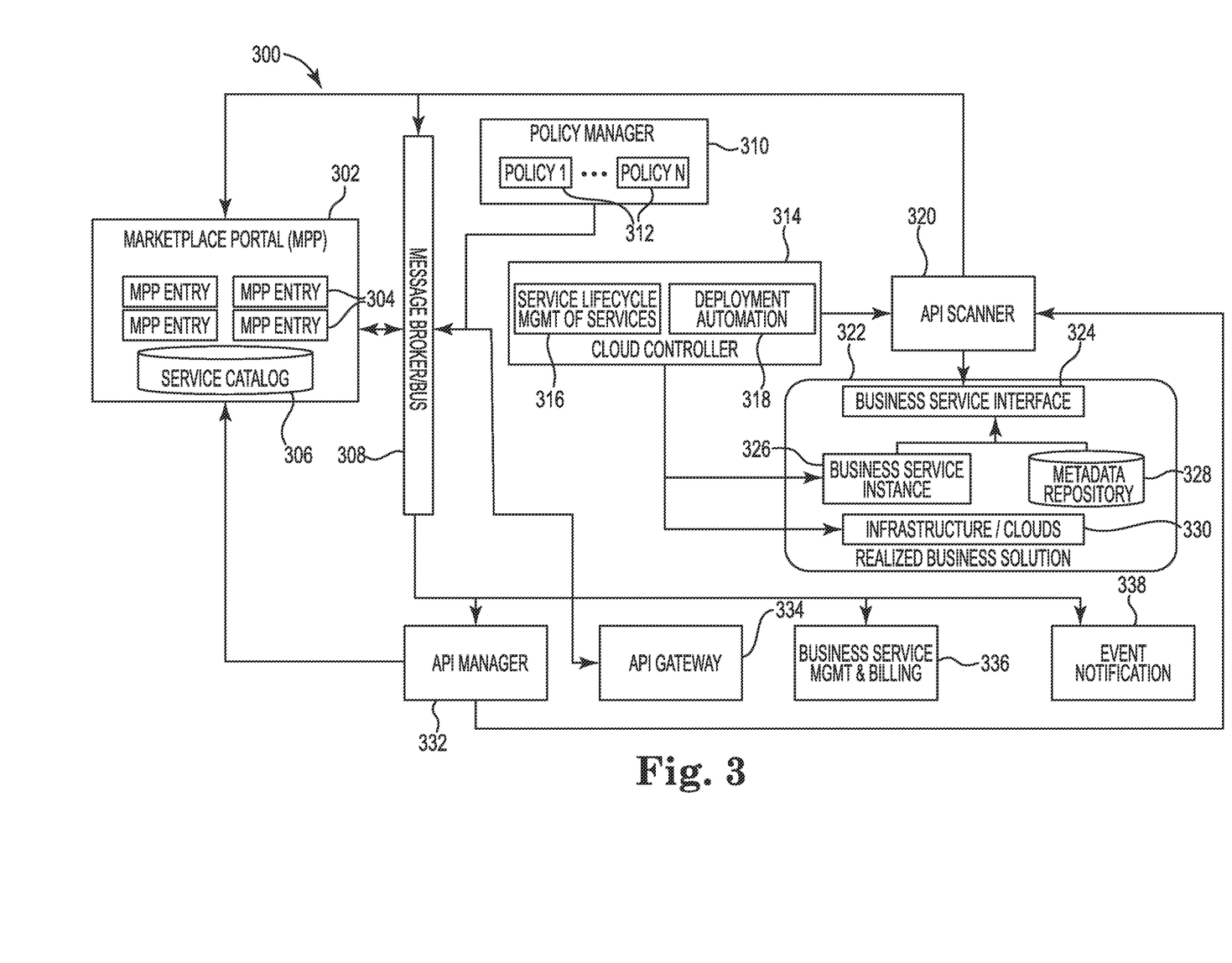
FIG. 3 is a diagram illustrating an automated API discovery and management system according to one example.

FIG. 3 is a diagram illustrating an automated API discovery and management system 300 according to one example. System 300 includes marketplace portal (MPP) 302, message broker/bus 308, policy manager 310, cloud controller 314, API scanner 320, realized business solution 322, API manager 332, API gateway 334, business service management and billing unit 336, and event notification unit 338.

Marketplace portal 302 includes a plurality of marketplace portal (MPP) entries 304 and a service catalog 306. In one example, marketplace portal 302 includes a web interface that enables a consumer to select a business service from service catalog 306, and order or subscribe to the business service. Consumer orders of business services are represented by the marketplace portal entries 304.

When a consumer orders a business service, the marketplace portal 302 notifies the cloud controller 314 of the order via the message broker/bus 308. In one example, the cloud controller 314 orchestrates the entire lifecycle management of a business service (e.g., provision infrastructure, install, configure, activate, etc.). The cloud controller 314 includes a service lifecycle management of services unit 316 and a deployment automation unit 318. When the cloud controller 314 receives a notification that a consumer has placed an order for a business service, the deployment automation unit 318 provisions necessary servers and generates an instance 326 of the ordered business service, which is deployed to infrastructure/clouds 330 (e.g., an infrastructure service environment). At that point, the business service instance 326 begins running on the server and exposes at least one API.

The business service instance 326 and the infrastructure/clouds 330 are part of the realized business solution 322, which also includes business service interface 324 and metadata repository 328. It is assumed in FIG. 3 that at least one instance 326 of a business service exists or its description exists in metadata repository 328 (e.g., SOA registry, Enterprise Architecture repository, API Manager).

After a consumer has ordered a specific business service from the marketplace portal 302, and that business service has been instantiated into business service instance 326 as described above, API scanner 320 then performs an intelligent discovery (e.g., using reverse engineering and scanning techniques) of the APIs exposed by the instantiated business service 326. The API scanner 320 may search for metadata associated with APIs in order to discover APIs in instantiated business services.

A next step is the exposure of the discovered API information for future consumers to benefit from the discovered API information. API scanner 320 provides the API information to marketplace portal 302. In the illustrated example, API scanner 320 also utilizes message broker/bus 308 to facilitate publishing API information to various systems, including: (1) publishing API information into API manager 332 (e.g., authoring/maintaining APIs); (2) publishing API information into API gateway 334 (e.g., to configure the API gateway 334 to enforce access control, throttling, proxy or hide real endpoint URL, etc., for the business service); (3) publishing API information into business service management and billing unit 336 so that the management/monitoring infrastructure is activated for business activity monitoring at the API level; and publishing API information into event notification unit 338. Event notification unit 338 provides a notification of an event of publishing or updating an API to interested (e.g., opt-in) parties, such as existing or prospective users of the business service. The notification may be provided to users via user interface 204 (FIG. 2), and/or via email, text message, or other method. The notification from unit 338 informs the users how to access and use the APIs. This notification facilitates gaining further adoption of discovered APIs and markets the availability and feature enhancements of the exposed services.

As mentioned above, discovered API information is published into API manager 332. This information includes the standard definitions of each discovered API and the documentation associated with each discovered API. API manager 332 manages the lifecycle of API definitions. API manager 332 provides the API information to marketplace portal 302. In one example, the definitions of an API for a given version of a business service are published into the API manager 332 once, and then multiple instances of that API are dynamically deployed without user intervention and used to automatically configure API gateway endpoints.

API gateway 334 provides for secure access to enterprise information for internal and external development devices. The types of functions that the API gateway 334 may provide, which may be controlled by the API manager 332, may include access control (e.g., filtering traffic so only authenticated/authorized traffic gets through), rate limiting (e.g., restricting how much traffic can be sent by each developer device in association with each API), analytics/metrics capture and logging (tracking what's going on with each of the APIs), security filtering (e.g., checking the content on incoming messages for attacks), and redirection/traffic routing (e.g., sending traffic to different endpoints in the infrastructure of the system depending on the sender or the request).

As mentioned above, discovered API information is published into the API gateway 334 to configure the API gateway 334 to, for example, enforce access control. One example of access control is to control access to APIs based on policies and business rules. Policy manager 310 includes a plurality of policies 312 that provide information for constraining access to the APIs. Policy manager 310 dynamically updates and configures the API gateway 334, without user intervention, based on policies 312, and then the API gateway 334 controls access to APIs based on rules specified in the policies 312. API gateway 334 manages the API endpoints for business service instances. API gateway 334 is also automatically updated with new API information whenever a change occurs to the current APIs, such as when a change is deployed to a business service that causes a change in the APIs of the business service. Such API changes are automatically detected and used to update API gateway 334 accordingly.

As mentioned above, API information is also published into the business service management and billing unit 336 so that the management/monitoring infrastructure is activated for business activity monitoring at the API level. The monitoring includes metering usage of APIs for billing purposes. Customers can be charged for usage of the APIs based on established billing policies.

The API discovery according to examples disclosed herein also involves detecting updates when the API endpoint of the business service is moved (e.g., even by an infrastructure-as-a-service provider without knowledge of the consumer), and providing updated information regarding accessing the API. Also, if a business service is terminated by a consumer, system 300 automatically removes the API gateway endpoints for that business service as part of the termination process. System 300 provides full life cycle automated management of APIs, including API discovery when a business service is instantiated into an environment, gateway configuration including setting up permissions based on policy, updating the gateway as the business service is updated (if the APIs change), notifications back to consumers regarding how to access the APIs, and termination of the business service and removal of API gateway endpoints.

System 300 enables self-service, one-click deployment and consumption enablement of complex business solutions, and end-to-end automation of business solutions or applications. System 300 automates publishing of API information. System 300 activates controls on consumption of the API using gateway 334, activates the ability to manage the service at the API level and activates the metering (if provided) to enable usage-based billing using unit 336. System 300 also provides automatic updates of API endpoints when deployed solutions or applications are moved.

Examples of the present disclosure include those described below. It is noted that the examples disclosed herein may also be combined in various ways.

One example is directed to a system that includes a federated marketplace portal to allow a user to browse, order, and manage business services offered by a plurality of cloud marketplaces based at least in part on application programming interface (API) abstractions. The system includes an integration system to transform the API abstractions into product-specific APIs used by the cloud marketplaces and cause the invocation of the product-specific APIs.

In one example, the plurality of cloud marketplaces are provided by multiple companies. The business services may be stored by the cloud marketplaces without being aggregated into the federated marketplace portal. In one example, the integration system performs data and key transformations of result sets returned by the product-specific APIs and provides results of the data and key transformations to the federated marketplace portal. The API abstractions according to one example include Create, Search, View, Update, Delete, Order, Manage, and Terminate. The integration system may include a portal federation framework to store metadata to facilitate integration of content from the plurality of marketplaces. The federated marketplace portal may include a policy manager to enforce specific policies of the plurality of cloud marketplaces regarding the sharing of the business services. The federated marketplace portal may include a federated automation repository to store code modules for performing lifecycle automation steps. The federated marketplace portal may synchronize automation content stored in the federated automation repository with automation repositories associated with the plurality of cloud marketplaces. In one example, the federated marketplace portal includes a federated model repository to facilitate brokering and sharing model specifications. The model specifications may include Topology and Orchestration Specification for Cloud Applications (TOSCA).

Figure 4:
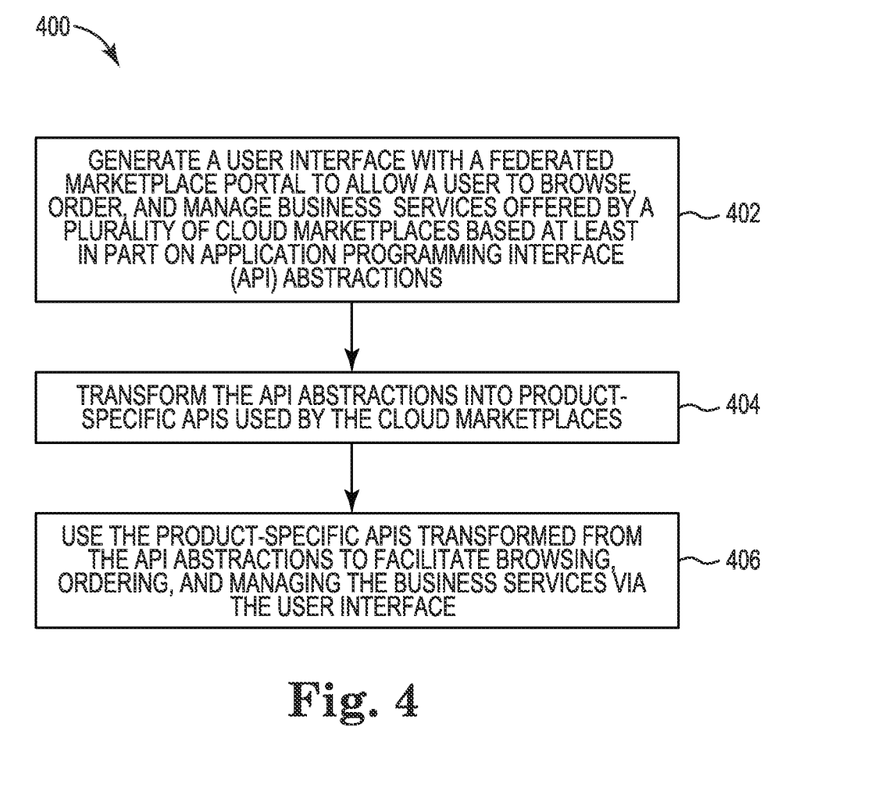
FIG. 4 is a flow diagram illustrating a federated marketplace method according to one example.

Another example is directed to a federated marketplace method. FIG. 4 is a flow diagram illustrating a federated marketplace method 400 according to one example. At 402 in method 400, a user interface is generated with a federated marketplace portal to allow a user to browse, order, and manage business services offered by a plurality of cloud marketplaces based at least in part on application programming interface (API) abstractions. At 404, the API abstractions are transformed into product-specific APIs used by the cloud marketplaces. At 406, the product-specific APIs transformed from the API abstractions are used to facilitate browsing, ordering, and managing the business services via the user interface. In one example, method 400 also includes transforming result sets returned by the product-specific APIs; and providing the transformed result sets to the federated marketplace portal.

Another example is directed to a non-transitory computer-readable storage medium storing computer-executable instructions, executed by at least one processor, to: generate a user interface with a federated marketplace portal to allow a user to browse, order, and manage business services offered by a plurality of cloud marketplaces; send application programming interface (API) abstractions from the federated marketplace portal to an integration system based on interaction of the user with the user interface; transform, with the integration system, the API abstractions into product-specific APIs used by the cloud marketplaces; and use the product-specific APIs transformed from the API abstractions to facilitate browsing, ordering, and managing the business services via the user interface. In one example, the computer-readable storage medium also includes instructions to: store automation content for performing lifecycle automation steps in a federated automation repository; and synchronize the automation content stored in the federated automation repository with automation repositories associated with the plurality of cloud marketplaces.

Another example is directed to a system that includes a marketplace portal to allow a user to order a business service, and a cloud controller to deploy an instance of the ordered business service to a cloud environment. The system also includes an application programming interface (API) scanner to discover API information including at least one API exposed by the deployed instance of the ordered business service, and publish the discovered API information to another service. The another service may include an API manager that manages a lifecycle of API definitions. The another service may include an API gateway to provide user devices with authorized access to APIs. In one example, a policy manager dynamically configures the API gateway based on access control policies. In one example, the API scanner detects an update to the discovered API information and provides corresponding updated API information to the API gateway. The update may include a change in an API endpoint. The another service may include a management and billing unit for monitoring of the business service at an API level for billing purposes. The another service may include an event notification unit to provide a notification to existing and prospective users of the business service regarding the discovered API information.

Figure 5:
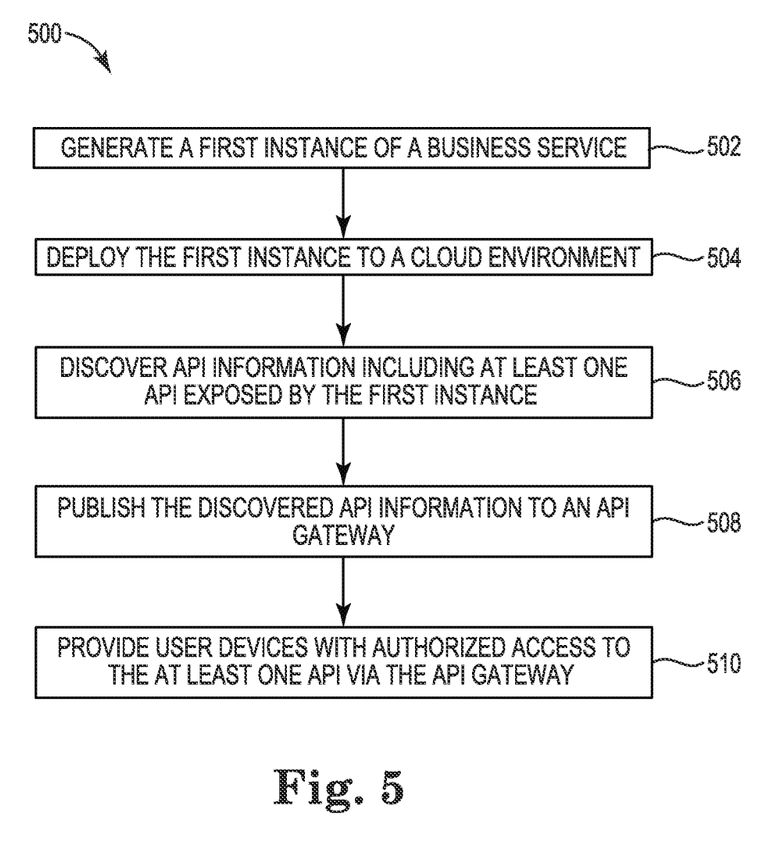
FIG. 5 is a flow diagram illustrating an API discovery and management method according to one example.

Another example is directed to an API discovery and management method. FIG. 5 is a flow diagram illustrating an API discovery and management method 500 according to one example. At 502 in method 500, a first instance of a business service is generated. At 504, the first instance is deployed to a cloud environment. At 506, API information including at least one API exposed by the first instance is discovered. At 508, the discovered API information is published to an API gateway. At 510, user devices are provided with authorized access to the at least one API via the API gateway. In one example, method 500 also includes publishing the discovered API information to an API manager that manages a lifecycle of API definitions. Method 500 may include detecting an update to the discovered API information, wherein the update includes a change in an API endpoint; and publishing the detected update to the API gateway. Method 500 may include publishing the discovered API information to a management and billing unit for monitoring of the business service at an API level for billing purposes. Method 500 may include publishing the discovered API information to an event notification unit to provide a notification to existing and prospective users of the business service regarding the discovered API information.

Another example is directed to a non-transitory computer-readable storage medium storing computer-executable instructions, executed by at least one processor, to: generate a first instance of a business service; deploy the first instance to a cloud environment; discover at least one API exposed by the first instance; and publish the discovered at least one API to an API manager that manages a lifecycle of API definitions. The computer-readable storage medium may also include instructions to publish the discovered API information to at least one of: an API gateway that provides user devices with authorized access to the at least one API, a management and billing unit for monitoring of the business service at an API level for billing purposes, and an event notification unit to provide a notification to existing and prospective users of the business service regarding the discovered at least one API.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system, comprising:
a hardware processor; and
a non-transitory machine-readable storage medium encoded with instructions executable by the hardware processor to perform operations to:
transform application programming interface (API) abstractions into product-specific APIs used by a plurality of cloud marketplaces and cause invocation of the product-specific APIs in an integration system;
provide result sets, generated by the product-specific APIs based on user interactions, to the integration system;
transform, by the integration system, result sets returned by the product-specific APIs into a canonical form, wherein the transformed result sets are transmitted to a federated marketplace portal;
use the transformed result sets to facilitate browsing, ordering, and managing business services offered by the cloud marketplaces through a federated marketplace portal;
instantiate one of the business services into a business service instance responsive to the user ordering the one of the business services;
automatically discover the product-specific APIs exposed by the business service instance;
publish the discovered product-specific APIs to an API gateway;
detect updates to the discovered product-specific APIs;
responsive to detecting an update to one of the discovered product-specific APIs,
provide corresponding updated API information to the API gateway;
provide a notification of the updated API information to the user;
store code modules for performing lifecycle automation steps in a federated automation repository; and
synchronize automation content stored in the federated automation repository with automation repositories associated with the plurality of cloud marketplaces.

2. The system of claim 1, wherein the plurality of cloud marketplaces are provided by multiple companies.

3. The system of claim 1, wherein the business services are stored by the cloud marketplaces without being aggregated into the federated marketplace portal.

4. The system of claim 1, wherein the API abstractions include Create, Search, View, Update, Delete, Order, Manage, and Terminate.

5. The system of claim 1, wherein the instructions are executable by the hardware processor to perform operations to:
provide a portal federation framework to store metadata to facilitate integration of content from the plurality of marketplaces.

6. The system of claim 1, wherein the instructions are executable by the hardware processor to perform operations to:
enforce specific policies of the plurality of cloud marketplaces regarding the sharing of the business services.

7. The system of claim 1, wherein the instructions are executable by the hardware processor to perform operations to:
facilitate brokering and sharing model specifications.

8. The system of claim 7, wherein the model specifications include Topology and Orchestration Specification for Cloud Applications (TOSCA).

9. The system of claim 1, wherein the system further performs operations comprising:
publishing the discovered product-specific APIs to a billing unit; and
monitoring, at the billing unit, business activity at the discovered product-specific APIs.

10. The system of claim 1, wherein the system further performs operations comprising:
receiving a user request to terminate the instantiated business service; and automatically removing, in response to the user request, API gateway endpoints for the business service.

11. A computer-implemented method performed by one or more processors, the method comprising:
generating a user interface with a federated marketplace portal to allow a user to browse, order, and manage business services offered by a plurality of cloud marketplaces based at least in part on application programming interface (API) abstractions;
transforming the API abstractions into product-specific APIs used by the cloud marketplaces;
providing result sets, generated by the product-specific APIs based on user interaction, to an integration system;
transforming, by the integration system, result sets returned by the product-specific APIs into a canonical form, wherein the transformed result sets are transmitted to the federated marketplace portal;
using the transformed result sets to facilitate browsing, ordering, and managing the business services through the federated marketplace portal;
instantiating one of the business services into a business service instance responsive to the user ordering the one of the business services;
automatically discovering the product-specific APIs exposed by the business service instance;
publishing the discovered product-specific APIs to an API gateway; detecting updates to the discovered product-specific APIs;
responsive to detecting an update to one of the discovered product-specific APIs;
providing corresponding updated API information to the API gateway;
providing a notification of the updated API information to the user;
storing automation content for performing lifecycle automation steps in a federated automation repository; and
synchronizing the automation content stored in the federated automation repository with automation repositories associated with the plurality of cloud marketplaces.

12. The computer-implemented method of claim 11, further comprising:
providing a portal federation framework to store metadata to facilitate integration of content from the plurality of marketplaces.

13. A non-transitory computer-readable storage medium storing computer-executable instructions, which when executed by at least one processor, cause the at least one processor to perform operations comprising:
generate a user interface with a federated marketplace portal to allow a user to browse,
order, and manage business services offered by a plurality of cloud marketplaces;
send application programming interface (API) abstractions from the federated marketplace portal to an integration system based on interaction of the user with the user interface;
transform, with the integration system, the API abstractions into product-specific APIs used by the cloud marketplaces; and
provide result sets, generated by the product-specific APIs based on user interaction, to the integration system;
transform, with the integration system, result sets returned by the product-specific APIs into a canonical form, wherein the transformed result sets are transmitted to the federated marketplace portal;
use the transformed result sets to facilitate browsing, ordering, and managing the business services through the federated marketplace portal;
instantiate one of the business services into a business service instance responsive to the user ordering the one of the business services;
automatically discover the product-specific APIs exposed by the business service instance;
publish the discovered product-specific APIs to an API gateway;
detect updates to the discovered product-specific APIs;
responsive to detecting an update to one of the discovered product-specific APIs;
provide corresponding updated API information to the API gateway;
provide a notification of the updated API information to the user;
store automation content for performing lifecycle automation steps in a federated automation repository; and
synchronize the automation content stored in the federated automation repository with automation repositories associated with the plurality of cloud marketplaces.

14. The non-transitory computer-readable storage medium of claim 13, further comprising instructions to:
provide a portal federation framework to store metadata to facilitate integration of content from the plurality of marketplaces.

15. The non-transitory computer-readable storage medium of claim 13, further comprising instructions to:
enforce specific policies of the plurality of cloud marketplaces regarding the sharing of the business services.

* * * * *